(12) United States Patent
Yamane et al.

(10) Patent No.: US 12,074,391 B2
(45) Date of Patent: Aug. 27, 2024

(54) STRUCTURE FOR CONNECTING LEAD WIRE

(71) Applicant: SANYO Electric Co., Ltd., Daito (JP)

(72) Inventors: Takuya Yamane, Osaka (JP); Dai Yanase, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 395 days.

(21) Appl. No.: 17/442,049

(22) PCT Filed: Mar. 19, 2020

(86) PCT No.: PCT/JP2020/012310
§ 371 (c)(1),
(2) Date: Sep. 22, 2021

(87) PCT Pub. No.: WO2020/196268
PCT Pub. Date: Oct. 1, 2020

(65) Prior Publication Data
US 2022/0190495 A1 Jun. 16, 2022

(30) Foreign Application Priority Data
Mar. 28, 2019 (JP) .................. 2019-064717

(51) Int. Cl.
*H01R 11/28* (2006.01)
*H01M 50/213* (2021.01)
(Continued)

(52) U.S. Cl.
CPC ........ *H01R 11/281* (2013.01); *H01M 50/213* (2021.01); *H01M 50/249* (2021.01);
(Continued)

(58) Field of Classification Search
CPC .............. H01R 13/5812; H01R 13/582; H01R 13/5816; H01R 4/023; H01R 4/027;
(Continued)

(56) References Cited

U.S. PATENT DOCUMENTS 5,541,365 A 7/1996 Sugiura et al.
5,577,930 A * 11/1996 Dahlem ............... H01R 4/2454
439/942

(Continued)

FOREIGN PATENT DOCUMENTS

DE 19755719 A1 * 7/1999 ............. H01R 4/027
JP H06-325803 A 11/1994
WO 2018/168982 A1 9/2018

OTHER PUBLICATIONS

English translation of International Search Report dated Jun. 2, 2020, issued in counterpart Application No. PCT/JP2020/012310. (2 pages).

*Primary Examiner* — Renee S Luebke
*Assistant Examiner* — Paul D Baillargeon
(74) *Attorney, Agent, or Firm* — WHDA, LLP

(57) ABSTRACT

A connection portion of a lead wire is close to a surface of a metal plate, held at an accurate position, and held while preventing the wire from being movable. A connection structure of the lead wire includes the metal plate, the lead wire connected to the surface of the metal plate, and a pair of holding protrusions. The holding protrusions sandwich at least two parts of the lead wire to dispose the lead wire at a fixed position. Each of the holding protrusions has a holding gap sandwiching and holding the press-fitted lead wire. A connection space of the lead wire and the metal plate is provided between the holding protrusions. The lead wire is held on the surface of the metal plate with the holding protrusions and is connected to the surface of the metal plate in the connection space.

15 Claims, 11 Drawing Sheets

(51) Int. Cl.
*H01M 50/249* (2021.01)
*H01M 50/298* (2021.01)
*H01M 50/516* (2021.01)
*H01R 4/02* (2006.01)

(52) U.S. Cl.
CPC ....... *H01M 50/298* (2021.01); *H01M 50/516* (2021.01); *H01R 4/023* (2013.01)

(58) Field of Classification Search
CPC ............ H01R 2201/26; H01M 50/249; H01M 50/516; H01M 50/298; H01M 50/213
See application file for complete search history.

(56) References Cited

U.S. PATENT DOCUMENTS

| | | | |
|---|---|---|---|
| 7,077,687 B1* | 7/2006 | Feistkorn | H01R 12/53 |
| | | | 439/399 |
| 9,293,840 B2* | 3/2016 | Wasai | H01R 4/245 |
| 9,444,159 B2* | 9/2016 | Lappoehn | H01R 12/675 |
| 2015/0038002 A1* | 2/2015 | Sabo | H01R 4/2433 |
| | | | 439/395 |
| 2020/0243830 A1 | 7/2020 | Tanaka et al. | |

* cited by examiner

STRUCTURE FOR CONNECTING LEAD WIRE

TECHNICAL FIELD

The present invention relates to a lead wire connection structure including a lead wire and a metal plate electrically connected to the lead wire.

BACKGROUND ART

A structure for electrically connecting a lead wire to a metal plate is often employed in various applications. In the connection structure, a tip end of the lead wire is soldered or welded to the metal plate, or a solderless terminal is connected to the tip end of the lead wire by a crimping structure, and the solderless terminal is screwed to the metal plate.

When the tip end of the lead wire is electrically connected to the metal plate by soldering or welding, the connection portion of the copper wire tip end portion is disposed and held at a fixed position on a surface of the metal plate. This is because if there is a gap between the tip end portion and the metal plate, the tip end portion cannot be reliably connected. A structure in which the tip end portion of a lead wire is held at a fixed position and soldered has been developed. (see PTL 1)

CITATION LIST

Patent Literature

PTL 1: International Patent Application Publication No. WO2018/168982

SUMMARY OF THE INVENTION

Technical Problem

In the connection structure of PTL 1, lead wire 92 is connected to metal plate 91, as shown in FIG. 12. Metal plate 91 includes locking connection portion 93 that locks and connects lead wire 92 to a fixing portion of lead wire 92. A pair of slits 94 for guiding lead wire 92 are opened on the side edge of locking connection portion 93. Lead wire 92 is bent in the middle to have a U-shape and guided to the pair of slits 94 to be held at a fixed position, and the tip end of core wire 92a is welded and fixed to metal plate 91.

In the connection structure described above, the middle of the lead wire can be held at a fixed position. However, in this held state, the restoring force of the core wire or the insulative coating acts on the lead wire bent in the U-shape in a direction in which the tip end of the core wire is separated from the front surface of the metal plate. For this reason, the tip end of the core wire hardly contacts the front surface of the metal plate in the locked state reliably and stably, and this hinders reliable connection. Additionally, there is also an adverse effect that since the lead wire is held at a position away from the tip end of the core wire, the tip end of the core wire of the lead wire easily moves even in the held state, and it is difficult to dispose the lead wire in the connection portion in a non-moving state.

The present invention has been developed to also solve the above-mentioned drawbacks, and it is an object of the present invention to provide, with an extremely simple structure, a lead wire connection structure electrically connecting a connection portion of a lead wire to a metal plate reliably and stably, by bringing a connection portion of the lead wire close to a front surface of the metal plate, holding the connection portion of the lead wire in an accurate position, and holding the connection portion of the lead wire in a hardly movable state.

Another object of the present invention is to provide a lead wire connection structure that can hold a lead wire connected to a metal plate so as not to be disconnected due to vibration or impact.

Solution to Problem

A lead wire connection structure of the present invention includes: metal plate 1; lead wire 2 connected to a front surface of metal plate 1; and a pair of holding protrusions 3 that protrude from the front surface of metal plate 1, and sandwich at least two parts of lead wire 2 to dispose lead wire 2 in a fixed position. Holding protrusion 3 has holding gap 3a for sandwiching and holding press-fitted lead wire 2, connection space 4 of lead wire 2 and metal plate 1 is provided between the pair of holding protrusions 3, lead wire 2 is held on the front surface of metal plate 1 by the pair of holding protrusions 3, and lead wire 2 is connected to the front surface of metal plate 1 in connection space 4.

Advantageous Effects of Invention

The lead wire connection structure described above can, with an extremely simple structure, reliably and stably electrically connect a connection portion of a lead wire to a metal plate, by bringing the connection portion of the lead wire close to a front surface of the metal plate, holding the connection portion of the lead wire in an accurate position, and holding the connection portion of the lead wire in a hardly movable state. Additionally, a characteristic that the lead wire connected to the metal plate can be held so as not to be disconnected due to vibration or impact is also achieved.

DESCRIPTION OF EMBODIMENTS

Figure 1:
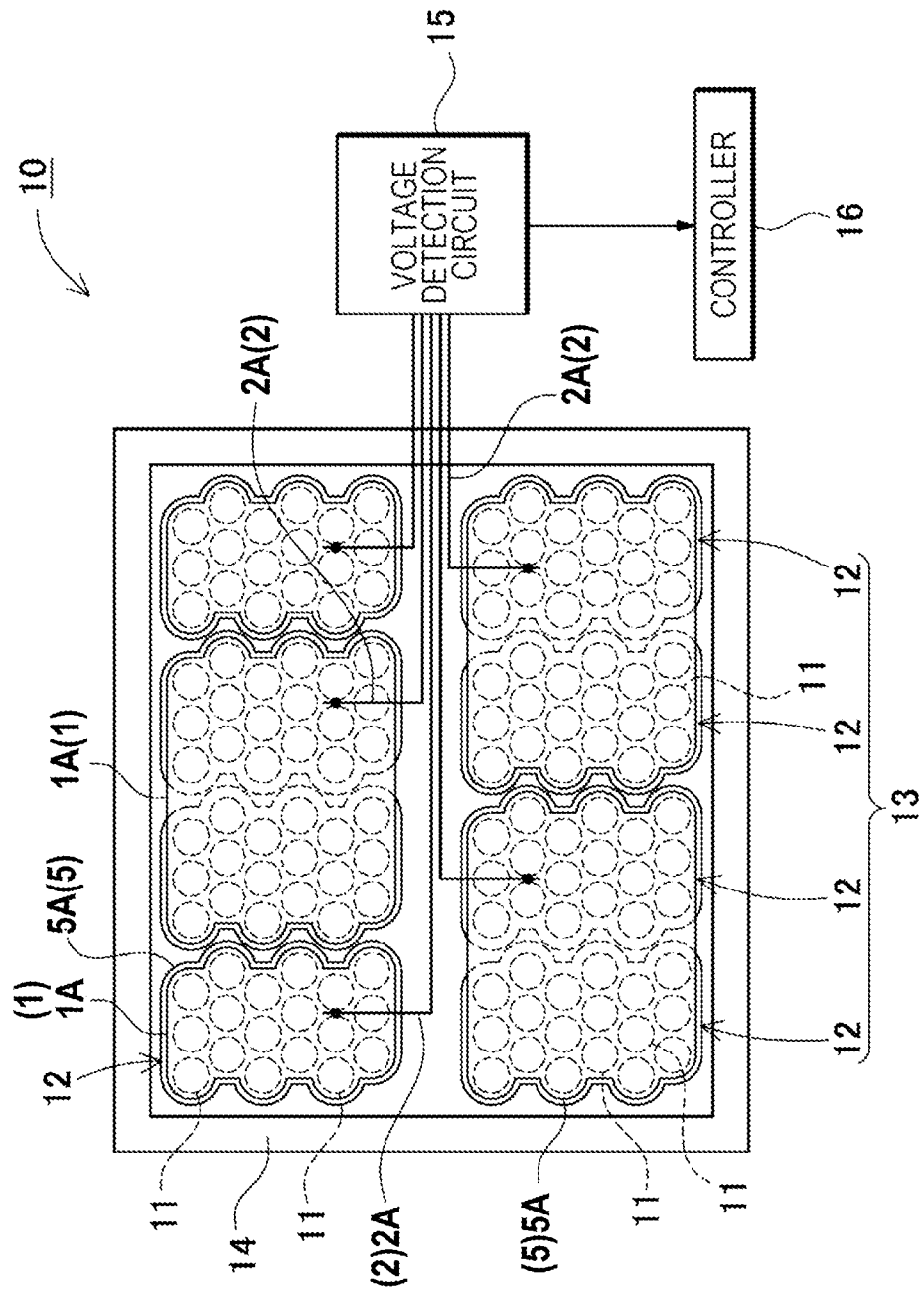
FIG. 1 is a schematic plan view of a power supply device including a lead wire connection structure according to a first exemplary embodiment of the present invention.

Hereinafter, the present invention will be described in detail with reference to the drawings. Note that in the following description, terms indicating specific directions and positions (e.g., "upper", "lower", and other terms including those terms) are used as necessary. These terms are used to facilitate understanding of the invention with reference to the drawings, and the technical scope of the present invention is not limited by the meanings of these terms. Additionally, parts denoted by the same reference numerals in multiple drawings indicate the same or equivalent parts or members.

Further, the following exemplary embodiments illustrate specific examples of the technical idea of the present invention, and do not limit the present invention. Additionally, unless otherwise specified, dimensions, materials, shapes, relative arrangements, and the like of the components described below are not intended to limit the scope of the present invention, but are intended to be illustrative. Additionally, the contents described in one exemplary embodiment or example is also applicable to other exemplary embodiments or examples. Additionally, sizes, positional relationships, and the like of members illustrated in the drawings may be exaggerated for clarity of description.

A lead wire connection structure of a first aspect of the present invention includes: a metal plate; a lead wire connected to a front surface of the metal plate; and a pair of holding protrusions that protrude from the front surface of the metal plate, and sandwich at least two parts of the lead wire to dispose the lead wire in a fixed position. Each of the holding protrusions has a holding gap for sandwiching and holding the press-fitted lead wire. A connection space of the lead wire and the metal plate is provided between the pair of holding protrusions. The lead wire is held on the front surface of the metal plate by the pair of holding protrusions. The lead wire is connected to the front surface of the metal plate in the connection space.

In the connection structure described above, the lead wire is held by being sandwiched at two parts with the pair of holding protrusions. The lead wire held at the two parts is connected to the metal plate in the connection space between the holding portions, so that the connection portion of the lead wire connected to the metal plate is disposed and connected at the fixed position. In particular, since the lead wire is held on both sides of the connection portion and disposed on the front surface of the metal plate, it is possible to curb displacement of the lead wire when the lead wire is welded or soldered to the metal plate. The lead wire connected in this state is connected to the front surface of the metal plate in an ideal state. Further, since the two parts of the metal plate are press-fitted into and held by the pair of holding protrusions and the connection portion is disposed in the fixed position, the connection portion of the lead wire is disposed at an accurate position while being hardly movable and in a position close to the metal plate with an extremely simple structure. In this state, the connection portion can be welded or soldered to reliably and stably establish electrical connection.

Figure 12:
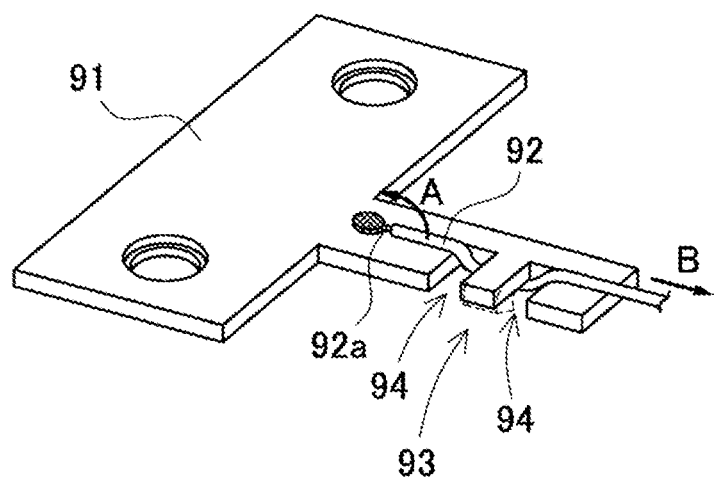
FIG. 12 is a perspective view of a conventional lead wire connection structure.

In the connection portion of the lead wire in which both sides are held by the holding protrusions, the core wire tip end portion is not separated from the metal plate and further displaced due to the restoring property of the lead wire as in the conventional connection structure illustrated in FIG. 12. The connection portion can be disposed at an ideal position of the metal plate and be connected reliably. Further, in the state of being connected to the metal plate, both sides of the connection portion are connected to the metal plate by the holding protrusion, and thus, it is possible to prevent the connection portion from being separated from the metal plate due to vibration or impact. For this reason, the above connection structure is characterized in that it is possible to stably maintain an ideal connection state for a long period of time while reliably connecting the connection portion to the metal plate.

In a lead wire connection structure of a second aspect of the present invention, the holding protrusion has an insertion gap through which the lead wire is guided and a holding gap that sandwiches and holds the lead wire guided from the insertion gap, the gap of the holding gap is narrower than that of the insertion gap, and the lead wire is sandwiched by the holding gap.

In a power supply device having the above configuration, the lead wire is smoothly press-fitted into the holding protrusion while being hardly displaced.

In a lead wire connection structure of a third aspect of the present invention, the pair of holding protrusions linearly hold the connection portion of the lead wire in the connection space.

In the above lead wire connection structure, the connection portion of the lead wire is disposed linearly to be connected to the metal plate reliably.

In a lead wire connection structure of a fourth aspect of the present invention, the interval (L) of the connection space is wider than twice the thickness of the lead wire and narrower than 15 times the thickness of the lead wire.

The above lead wire connection structure can reliably connect the connection portion of the lead wire to the front surface of the metal plate while holding the connection portion of the lead wire optimally.

In a lead wire connection structure of a fifth aspect of the present invention, the holding protrusion includes a pair of projecting rods arranged close to each other and parallel to each other. The insertion gap and the holding gap are provided between the projecting rods.

In the lead wire connection structure described above, the lead plate can be smoothly press-fitted from the insertion gap into the holding gap to hold the lead wire in a fixed position.

In a lead wire connection structure of a sixth aspect of the present invention, the lead wire includes an insulative coating and a coated wire having a surface coated with the insulative coating. The core wire includes an exposed portion exposed from the insulative coating. The exposed portion of the core wire is connected to the metal plate. The insulative coating is held in a fixed position by the pair of holding protrusions.

In the lead wire connection structure described above, while the lead wire having the insulative coating is smoothly press-fitted into the holding gap, in the press-fitted state, the lead wire can be held so as not to come off the holding gap due to the restorability of the insulative coating.

A lead wire connection structure of a seventh aspect of the present invention includes a holding body fixed to a back surface of the metal plate. The holding body has the pair of holding protrusions. The holding body is fixed to the metal plate. The holding protrusions are s provided on the front surface of the metal plate.

In the above lead wire connection structure, since the holding protrusion and the metal plate are formed as separate members, a lot of the holding protrusions can be easily produced, and the holding protrusion can be disposed on the metal plate.

In a lead wire connection structure of an eighth aspect of the present invention, the holding body is a resin-molded body placed and fixed on a back surface of the metal plate. The resin-molded body is provided by integrally forming the pair of holding protrusions. The metal plate has a through-hole therein. The holding protrusion passes through and protrude from the metal plate. The holding protrusion passes through the metal plate. The holding protrusion protrudes from the front surface of the metal plate.

In the lead wire connection structure described above, the holding protrusion is formed of a resin-molded body that can be produced in large quantities at low cost and the holding protrusion provided on the resin-molded body passes through the metal plate to provide the holding protrusion on the front surface of the metal plate. Hence, the holding protrusion is connected to the metal plate easily at fixed positions to connect the lead wire while the holding protrusion is formed of the resin-molded body that can be produced in large quantities at low cost.

In a lead wire connection structure of a ninth aspect of the present invention, the resin-molded body includes a battery holder allowing batteries to be arranged in fixed positions.

In the lead wire connection structure described above, since the holding protrusion is provided on the battery holder allowing the batteries to be disposed in fixed positions and the lead wire is disposed in a fixed position, it is not necessary to provide a dedicated part to provide the holding protrusion. Hence, both the assembly cost and the component cost are reduced, and the lead wire can be reliably connected to the lead plate at low cost.

In a connection structure of a lead wire of a tenth aspect of the present invention, the metal plate includes a lead plate connected to electrode terminals of the batteries to connect the batteries in series or in parallel to one another.

In the above lead wire connection structure, the lead wire is electrically connected to the lead plate easily and reliably.

A lead wire connection structure of an eleventh aspect of the present invention includes the holding protrusions formed by pressing the metal plate.

In the above lead wire connection structure, since the holding protrusions are provided by processing the metal plate connecting the lead wire, a dedicated member is not required to provide the holding protrusions, the component cost and the assembly cost are reduced, and the lead wire can be reliably connected to the lead plate.

In a lead wire connection structure of twelfth aspect of the present invention, the metal plate includes a chassis of a vehicle, and the lead wire includes a grounding wire connected to the chassis.

In the lead wire connection structure described above, the grounding wire of the vehicle can be connected to the chassis of the vehicle with small contact resistance reliably and stably, so as not to be disconnected due to vibration or impact.

A lead wire connection structure of a thirteenth aspect of the present invention includes a holding body fixed to the front surface of the chassis. The holding body has the holding protrusions. The holding body is fixed to the chassis. The holding protrusion is provided on the front surface of the chassis.

In the lead wire connection structure described above, the holding protrusion is provided as the holding body that is a separate member, and the holding protrusion is provided by fixing the holding protrusion to the chassis. Hence, there is no need to process the chassis of the vehicle into a special shape, and the grounding wire can be easily and reliably connected to all vehicles.

First Exemplary Embodiment

A lead wire connection structure according to the present exemplary embodiment is suitable for connecting a lead wire to a lead plate that connects batteries in series, in a power supply device in which multiple batteries are connected in series. Hereinafter, a power supply device in which a lead plate connected to electrodes of batteries is a metal plate and a voltage detection line connected to the lead plate to detect the voltage of the batteries is a lead wire will be detailed below as an exemplary embodiment.

In power supply device 10 illustrated in a schematic plan view of FIG. 1, lead wire 2 that is voltage detection line 2A that detects the voltage of battery 11 and inputs the voltage to voltage detection circuit 15 is connected to metal plate 1 of lead plate 1A that connects batteries 11 in series. In power supply device 10, multiple batteries 11 are connected in parallel by metal plate 1 to form core module 12 of the battery, and multiple core modules 12 are connected in series by metal plate 1 to form battery block 13. Battery block 13 is housed in battery case 14. Lead wire 2 has one end connected to metal plate 1 fixed to the electrode of battery 11 and the other end connected to the input side of voltage detection circuit 15, and inputs the voltage of battery 11 to voltage detection circuit 15.

Figure 2:
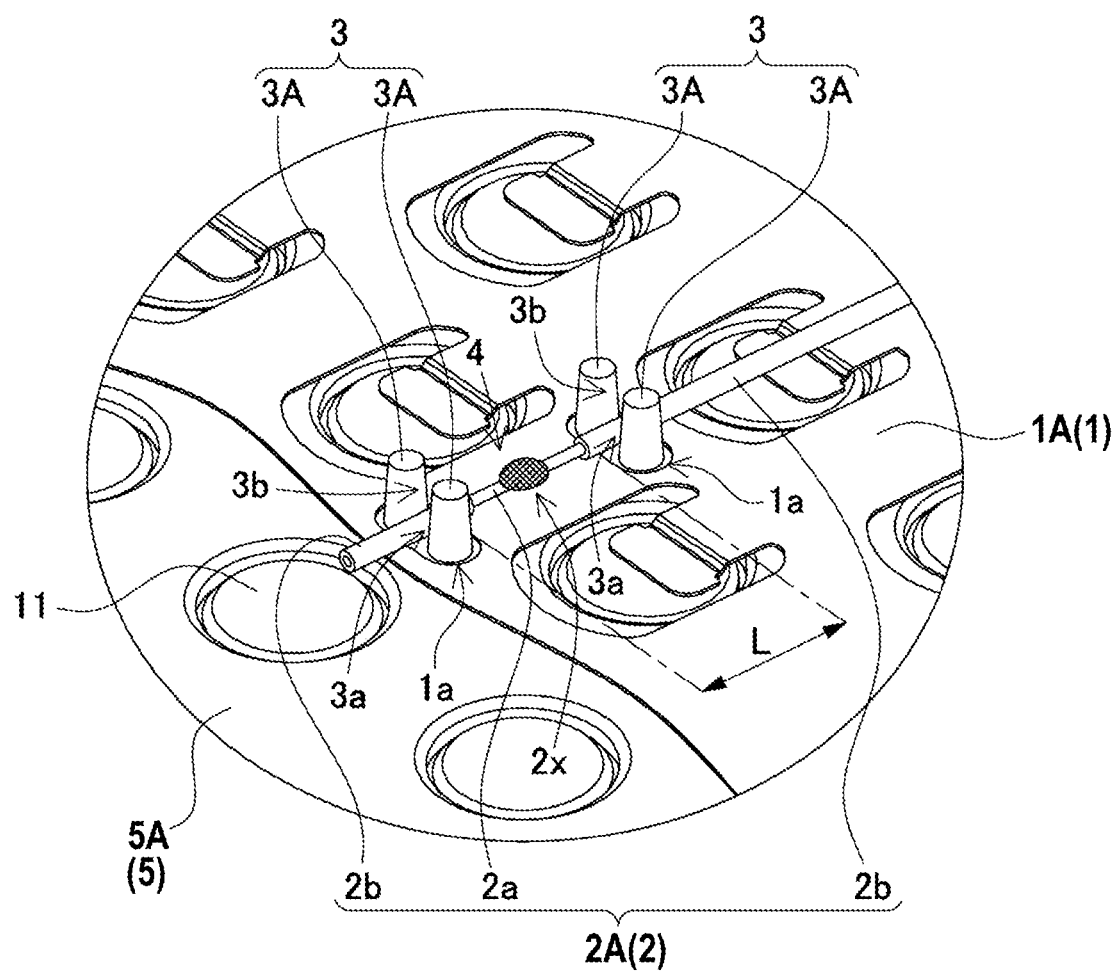
FIG. 2 is an enlarged cross-sectional perspective view of the lead wire connection structure of the power supply device illustrated in FIG. 1.

As illustrated in FIG. 2, a pair of holding protrusions 3 protruding from a front surface of metal plate 1 are provided in the connection region of lead wire 2 and metal plate 1. Each of the pair of holding protrusions 3 sandwiches respective one of two parts of lead wire 2 to dispose lead wire 2 in a fixed position. Holding protrusion 3 has holding gap 3a therein for sandwiching lead wire 2, and lead wire 2 is press-fitted and sandwiched in holding gap 3a. Connection space 4 for connecting lead wire 2 and the metal plate 1 is provided between the pair of holding protrusions 3. Lead wire 2 disposed in connection space 4 has two parts on both sides sandwiched by holding protrusions 3. Lead wire 2 in connection space 4 has both sides sandwiched by holding protrusions 3, and lead wire 2 is disposed on the front surface of metal plate 1 without being displaced. In this state, connection portion 2x of lead wire 2 is welded or soldered to the front surface of metal plate 1. As lead wire 2, a vinyl wire provided with core wire 2a at the center of insulative coating 2b, an enameled wire provided with a thin insulating film on the front surface of a core wire, such as a copper wire, a bare copper wire without an insulative coating on the front surface, or the like can be used. The enameled wire is obtained by baking a thin varnish insulating film, and polyvinyl formal, polyurethane, polyamide imide, polyester, nylon, or the like is used for the insulating film.

Holding protrusion 3 has insertion gap 3b therein that promptly guides lead wire 2 through the insertion gap, and holding gap 3a that sandwiches and reliably holds lead wire 2 guided through insertion gap 3b. In holding protrusion 3, lead wire 2 can be smoothly press-fitted into holding gap 3a by making holding gap 3a narrower than insertion gap 3b. Insertion gap 3b is preferably substantially equal to or slightly wider than the diameter of lead wire 2 so that lead wire 2 can be guided smoothly, and holding gap 3a is slightly narrower than the diameter of lead wire 2 so that lead wire 2 can be sandwiched firmly.

Each of the pair of holding protrusions 3 illustrated in FIG. 2 sandwich respective one of two parts of the lead wire 2, and linearly dispose connection portion 2x in connection space 4. This structure holds connection portion 2x of lead wire 2 while connection portion 2x is least likely to be displaced and is hardly deformed. Hence, when welding is performed by pressing a welding electrode against connection portion 2x, connection portion 2x is not displaced. When soldering is performed, connection portion 2x is not displaced. As a result, welding can be performed in an ideal state, and soldering can be performed to reliably connect connection portion 2x.

The interval (L) between the pair of holding protrusions 3, that is, connection space 4 may be narrow enough to hold lead wire 2 and prevent displacement at connection portion 2x, and may be enough long to facilitate welding and soldering. However, if the interval (L) of connection space 4 is too narrow, it is difficult to perform welding or soldering work. If the interval (L) is too wide, it is difficult to hold connection portion 2x while curbing displacement of connection portion 2x. Hence, the interval (L) is, for example, wider than twice the thickness of lead wire 2 and narrower than 15 times the thickness of lead wire 2. Accordingly, the interval (L) of connection space 4 is, for example, wider than 4 mm and narrower than 30 mm when the diameter of lead wire 2 to be connected ranges from 1 mm to 2 mm.

Figure 3:
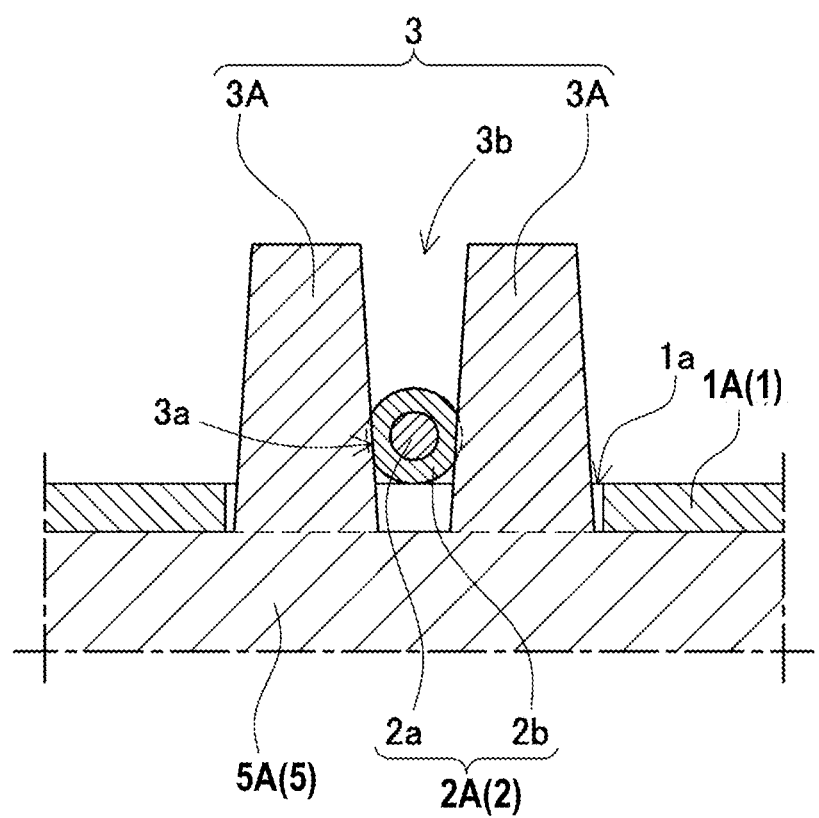
FIG. 3 is a vertical cross-sectional view of a holding protrusion of the lead wire connection structure illustrated in FIG. 2.

Holding protrusion 3 shown in FIGS. 2 and 3 includes a pair of projecting rods 3A disposed close to each other in parallel to each other. Holding gap 3a is provided between the pair of projecting rods 3A. In holding protrusion 3 shown in FIG. 2, projecting rod 3A has a cylindrical shape to allow lead wire 2 to be smoothly press-fitted and sandwiched. Cylindrical projecting rods 3A have tapered shapes that becomes thinner gradually toward the tip end, and form a gap that can fix lead wire 2 by sandwiching from both sides of lead wire 2.

Figure 4:
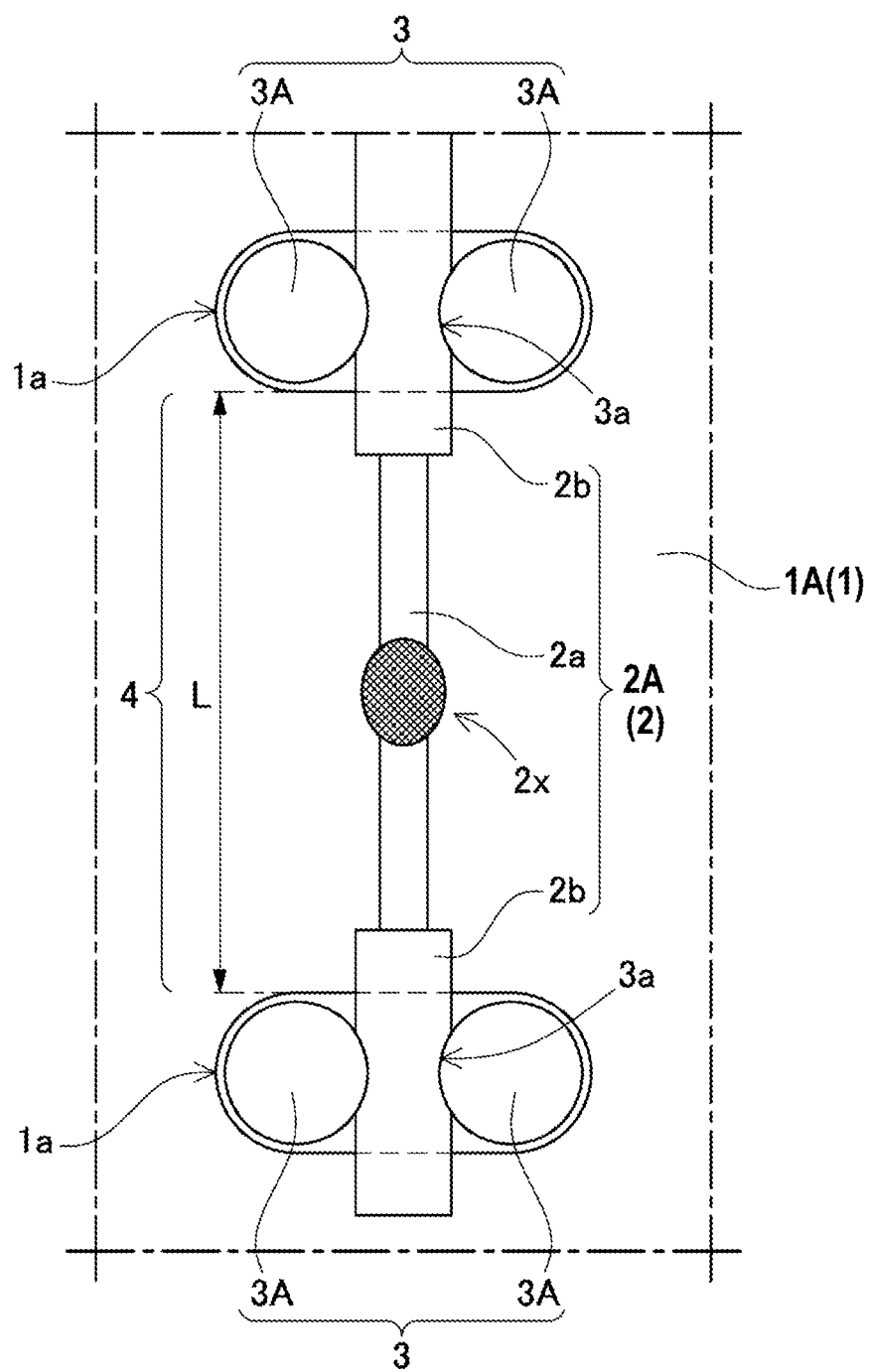
FIG. 4 is an enlarged plan view of another example of the lead wire connection structure.
Figure 5:
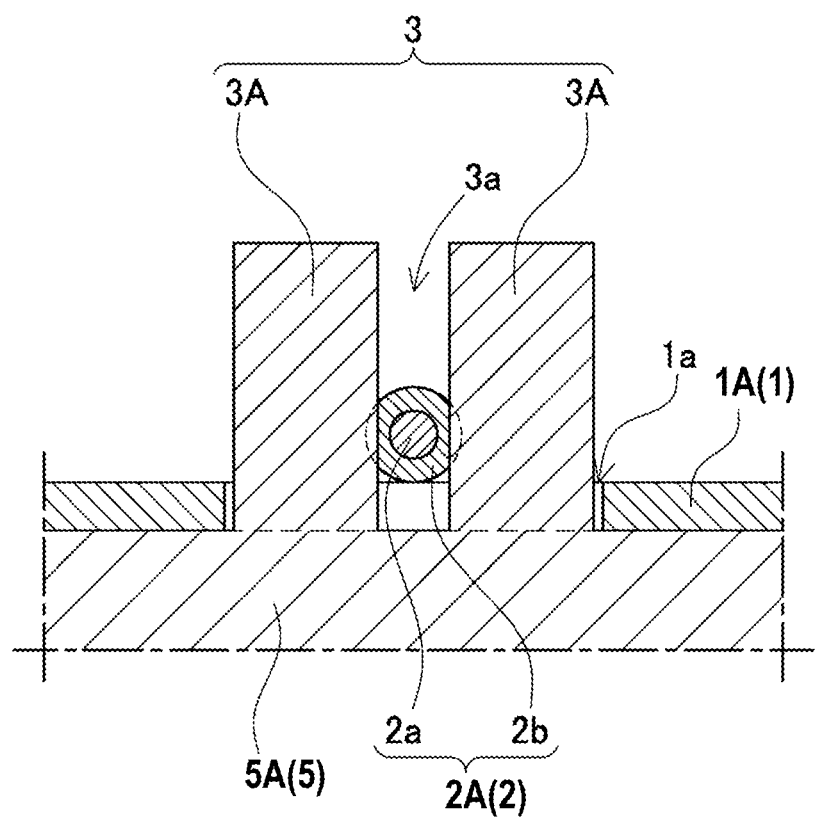
FIG. 5 is a vertical cross-sectional view of a holding protrusion of the lead wire connection structure illustrated in FIG. 4.

As illustrated in the enlarged plan view of FIG. 4, holding protrusion 3 that sandwiches the vinyl wire can crush and reliably sandwich insulative coating 2b of lead wire 2 press-fitted into holding gap 3a. The vinyl wire is deformed while the insulative coating 2b is sandwiched. Accordingly, as illustrated in the cross-sectional view of FIG. 5, holding protrusion 3 that sandwiches the vinyl wire can each be formed with the same thickness as a whole, to deform and smoothly press-fit insulative coating 2b into holding gap 3a. However, holding protrusion 3 can have insertion gap 3b wider than holding gap 3a in a tip end portion of projecting rod 3A to allow smoother lead wire 2 to be smoothly fitted in the gap. Further, holding protrusion 3 can press and sandwich lead wire 2 in a wide area by projecting rods 3A having prismatic shapes.

In lead wire 2 of a vinyl wire or an enameled wire, core wire 2a is exposed by removing a part of insulative coating 2b in the middle of insulative coating 2b, and the exposed portion of core wire 2a is connected to metal plate 1 as connection portion 2x. In the region of lead wire 2 press-fitted into holding gap 3a, insulative coating 2b is sandwiched by holding protrusions 3 and disposed in a fixed position without exposing core wire 2a. Accordingly, holding gap 3a is slightly narrower than the diameter of insulative coating 2b of lead wire 2. In the vinyl wire, when insulative coating 2b is press-fitted into holding gap 3a, insulative coating 2b is crushed and deformed by holding protrusions 3. Deformed insulative coating 2b presses holding protrusions 3 with restoring force to prevent displacement. Accordingly, the vinyl wire can be disposed in a fixed position, while deforming insulative coating 2b to be smoothly press-fitted into holding gap 3a and more effectively preventing displacement of connection portion 2x in the press-fitted state.

In the connection structure of lead wire 2 in FIGS. 2 and 3, metal plate 1 and holding protrusion 3 are provided as separate members. Holding protrusion 3 is provided on holding body 5 fixed to the back surface of metal plate 1. Holding body 5 is fixed to metal plate 1. Holding protrusion 3 is provided on the front surface of metal plate 1. Further, the connection structure of lead wire 2 shown in FIGS. 2 and 3 is a resin-molded body in which holding body 5 is placed and fixed on the back surface of metal plate 1, and the resin-molded body is battery holder 5A allowing batteries to be arranged in fixed positions. Battery holder 5A of the resin-molded body is provided by integrally forming the pair of holding protrusions 3. Metal plate 1 has through-hole 1a that allows holding protrusion 3 to pass through the through-hole and protrude from metal plate 1. Holding protrusion 3 is inserted into through-hole 1a of metal plate 1, and protrudes from the front surface of metal plate 1.

The structure in which holding protrusion 3 and holding body 5 functions as battery holder 5A are unitarily formed with battery holder 5A does not require a dedicated member for providing holding protrusion 3. Additionally, since holding protrusion 3 is formed by the mold for forming battery holder 5A, holding protrusion 3 is disposed at an accurate position while reducing the cost for providing holding protrusion 3. In battery holder 5A, metal plate 1 of lead plate 1A connected to an electrode of the battery is disposed in a fixed position by a fitting structure. Hence, the structure in which holding protrusion 3 is unitarily formed with battery holder 5A and in which holding protrusion 3 is inserted into through-hole 1a of metal plate 1 allows metal plate 1 and holding protrusion 3 to be disposed in accurate positions without being displaced from each other, and allows lead wire 2 to be reliably connected to metal plate 1, while providing metal plate 1 and holding protrusion 3 as separate members. Further, since power supply device 10 including plural batteries 11 includes plural metal plates 1 for connecting batteries 11 in series, and plural lead wires 2 connected to plural metal plates 1, a structure capable of easily and reliably connecting lead plate 1A to metal plate 1 achieves an ideal connection structure for this type of power supply device. Particularly, the present invention is suitable for power supply device 10 including a lot of metal plates 1 and lead wires 2. This is because the cost for arranging lead wire 2 at the fixed position can be reduced even though a lot of lead plates 1A are connected, and connection portion 2x of lead wire 2 can be accurately connected to the fixed position of lead plate 1A.

Holding protrusions 3 provided on battery holder 5A allow connection portion 2x of lead wire 2 disposed at an accurate position on the front surface of metal plate 1 to be reliably connected to metal plate 1 by pressing and welding the welding electrode or by soldering. Further, in the connected state, lead wire 2 is held at a fixed position on both sides of connection portion 2x, so that lead wire 2 is not disconnected from lead plate 1A due to vibration or impact, and lead wire 2 can be reliably connected to lead plate 1A for a long period of time. Furthermore, since lead plate 1A is connected to lead wire 2 in an ideal state, lead plate 1A is connected to and lead wire 2 reliably and stably in an ideal connection state, that is, a low resistance state. Hence, in an application in which lead wire 2 is used as voltage detection line 2A of battery 11, a characteristic that the voltage of battery 11 can be accurately detected over a long period of time is achieved. This is an effect of power supply device 10. This is because power supply device 10 that detects the voltage of battery 11 to control charging and discharging of battery 11 prohibits charging and discharging of battery 11 to secure safety in a state where the voltage of battery 11 cannot be normally detected, and therefore a connection failure of lead wire 2 disables use of power supply device 10.

As shown in FIG. 1, power supply device 10 including metal plate 1 as lead plate 1A connecting battery 11 and including lead wire 2 as voltage detection line 2A includes voltage detection circuit 15, controller 16, and a charging and discharging switch (not shown). Voltage detection circuit 15 is connected to positive and negative electrodes of each battery 11 through lead wire 2 and metal plate 1, and detects the voltage of battery 11. Voltage detection circuit 15 detects the voltage of each battery 11, and outputs the detected voltage of each battery 11 to controller 16. Controller 16 controls the charging and discharging switch to control charging and discharging of battery 11. The charging and discharging switch is connected in series to an output terminal (not shown) on an output side of batteries 11 directly connected to each other. The charging and discharging switch is, for example, a semiconductor switching element such as a field effect transistor (FET) or a transistor. The turning on and off of the charging and discharging switch is controlled by controller 16.

Controller 16 controls charging and discharging currents so as to prevent overcharge and overdischarge of each battery 11. For example, in the charged state, when the voltage of any one of the batteries increases to the maximum voltage, the charge current is cut off or limited to prevent overcharge. In the discharged state, when the voltage of any one of the batteries decreases to the optimum voltage, the discharge current is cut off or limited to prevent overdischarge.

Voltage detection circuit 15 may further include an equalizing circuit to eliminate voltage imbalance of each battery. The equalizing circuit detects the voltages of the batteries and equalizes the detected voltages to eliminate the voltage imbalance. The equalizing circuit detects the voltage of each battery and discharges a battery having a high voltage to eliminate an imbalance.

The above exemplary embodiment illustrates power supply device 10 in which metal plate 1 is lead plate 1A and lead wire 2 is voltage detection line 2A. The lead wire connection structure of the present invention does not limit metal plate 1 and lead wire 2 to those described above. For example, the metal plate may be a chassis of a vehicle, and the lead wire may be a grounding wire connected to the chassis.

Figure 6:
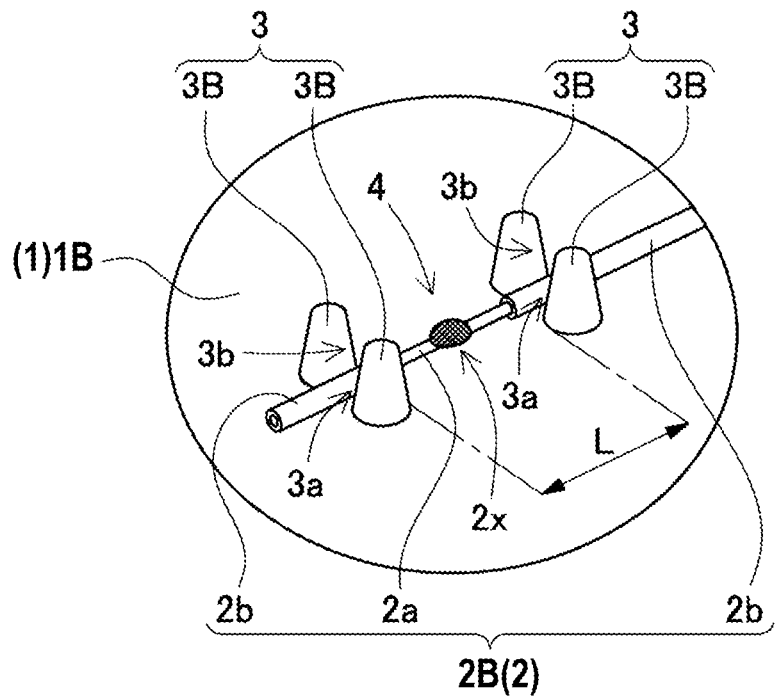
FIG. 6 is an enlarged perspective view of a lead wire connection structure according to a second exemplary embodiment of the present invention.
Figure 7:
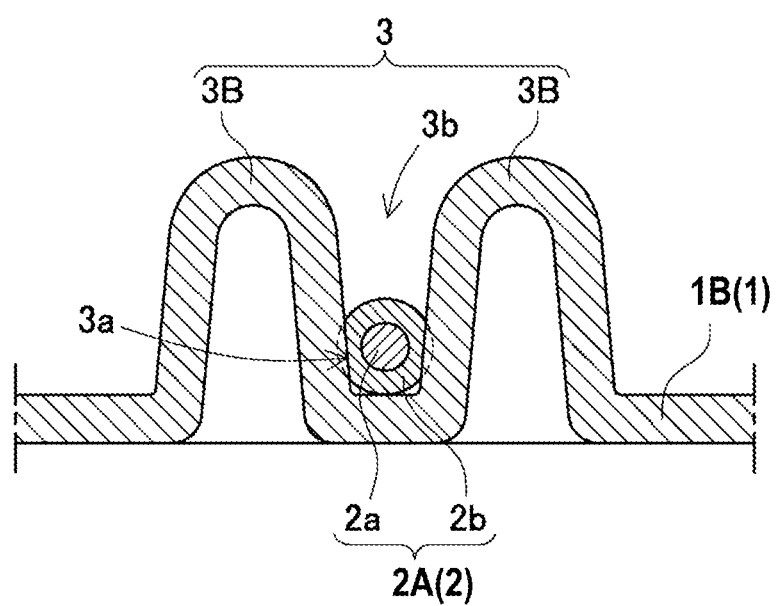
FIG. 7 is a vertical cross-sectional view of a holding protrusion of the lead wire connection structure illustrated in FIG. 6.
Figure 8:
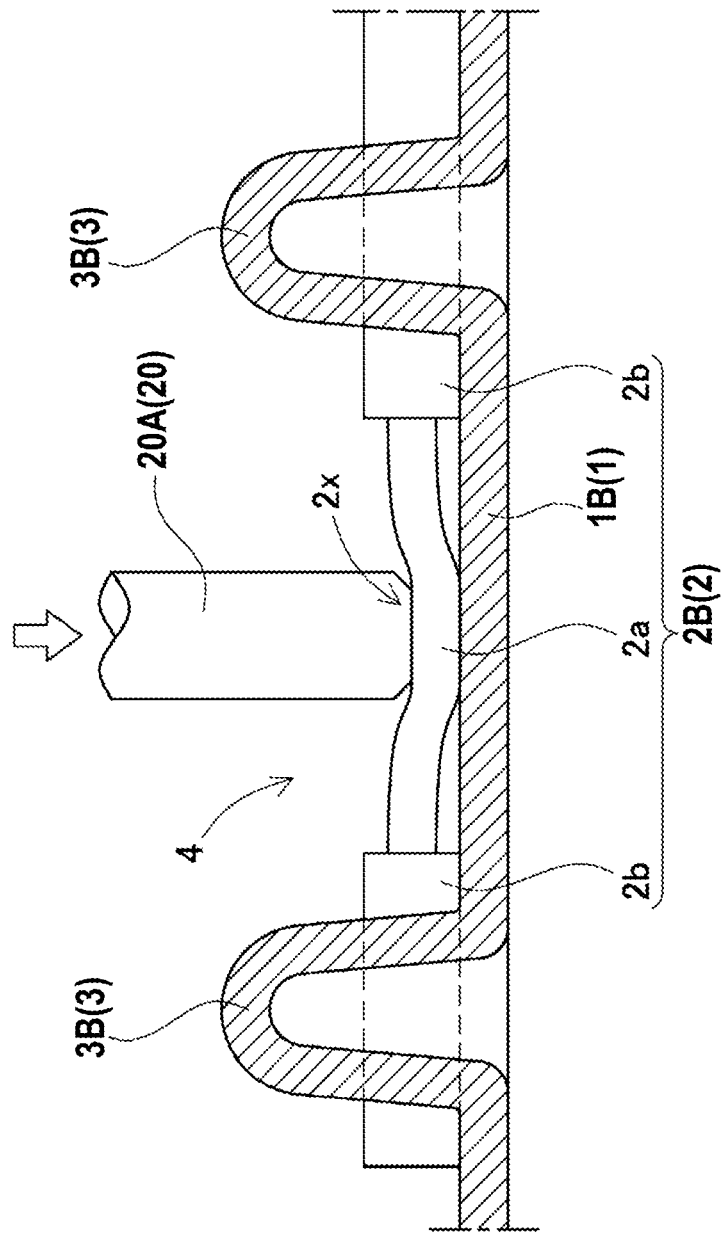
FIG. 8 is a longitudinal sectional view of the structure illustrating a state where a lead wire is welded to a metal plate in the connection structure illustrated in FIG. 6.
Figure 9:
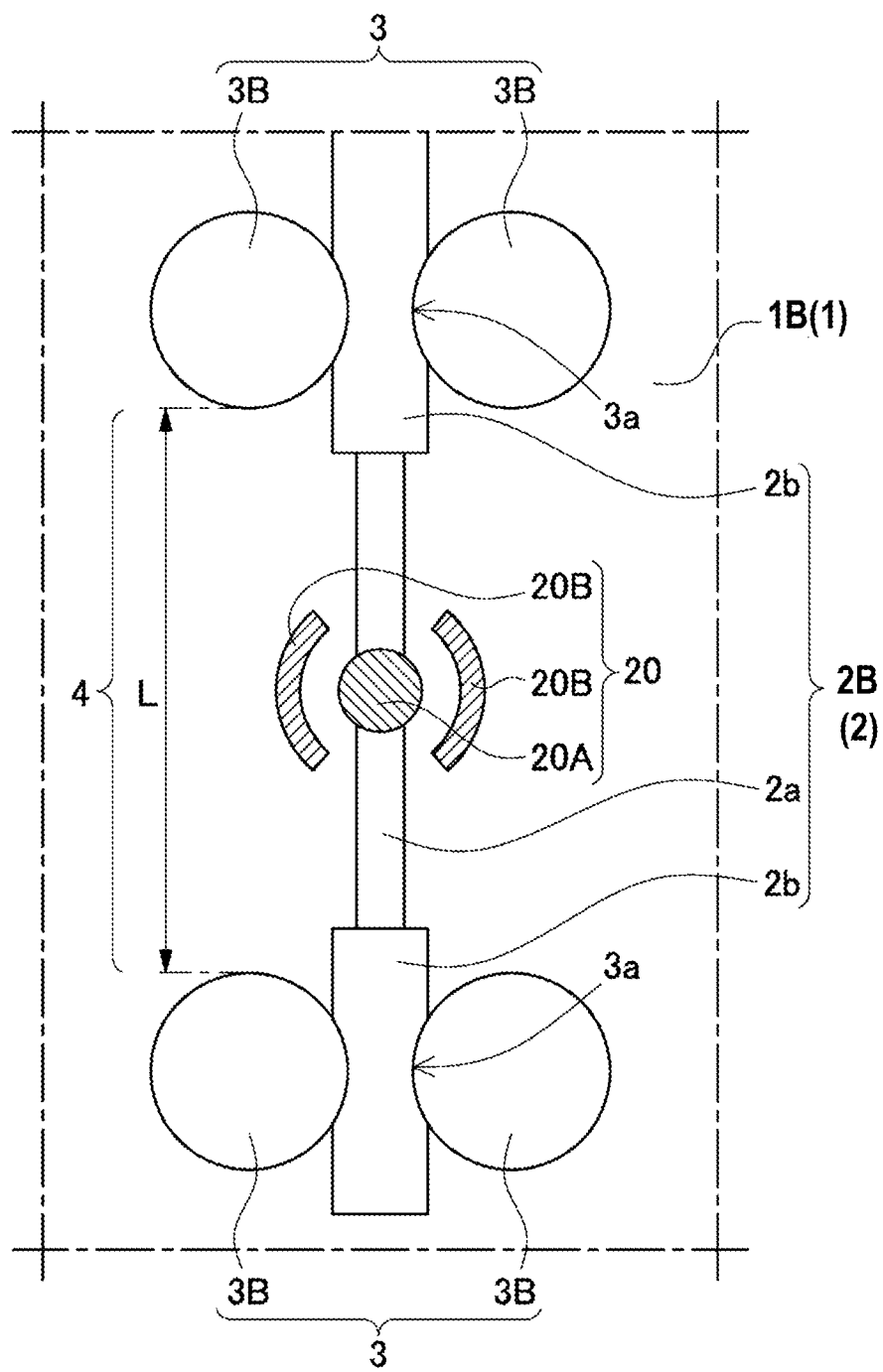
FIG. 9 is a plan view of the structure illustrating a state in which a lead wire is connected to a metal plate in the connection structure illustrated in FIG. 6.

In this application, as illustrated in FIGS. 6 and 7, metal plate 1 which is chassis 1B is pressed to provide a pair of holding protrusions 3. Each of holding protrusion 3 in FIGS. 6 and 7 includes a pair of projections 3B protruding close to each other, and holding gap 3a is provided between the pair of projections 3B. Projection 3B shown in FIGS. 6 and 7 has substantially a truncated cone shape having a cross-sectional area gradually decreases toward the tip end. Insertion gap 3b is formed by widening the interval toward the tip end side. Each of holding protrusions 3 sandwiches and holds respective one two parts of lead wire 2 constituting grounding wire 2B in holding gap 3a. In lead wire 2, a portion of core wire 2a is exposed and disposed in connection space 4 provided between the pair of holding protrusions 3, as connection portion 2x. In the exposed portion of core wire 2a, insulative coating 2b is removed to expose the copper wire. Each of holding protrusions 3 sandwiches insulative coating 2b to sandwich lead wire 2. Insulative coating 2b is made of insulating material, preferably insulating plastic coating, which is sandwiched and deformed by holding protrusions 3. In lead wire 2, the exposed portion of core wire 2a is disposed on the front surface of chassis 1B between the pair of holding protrusions 3. As illustrated in FIG. 8, core wire 2a is pressed against chassis 1B by welding electrode 20 and welded. In this welding, as illustrated in a plan view of FIG. 9, core wire 2a is pressed against metal plate 1 by first electrode 20A while second electrode 20B is pressed against metal plate 1. At this moment, electricity is supplied between first electrode 20A and second electrode 20B to weld core wire 2a to metal plate 1. In lead wire 2 with insulative coating 2b disposed on the front surface of metal plate 1 by holding protrusion 3, a fine gap corresponding to the film thickness of insulative coating 2b is formed between core wire 2a and the front surface of metal plate 1 in connection portion 2x. However, lead wire 2 is pressed by first electrode 20A to be welded in close contact with metal plate 1.

Alternatively, core wire 2a contacts or is close to the chassis to be connected by soldering. Grounding wire 2B connected to chassis 1B is disposed in a fixed position with both sides of core wire 2a sandwiched by holding protrusions 3. Accordingly, grounding wire 2B is connected to the front surface of chassis 1B by welding or soldering, and is further held at a fixed position of chassis 1B by the pair of holding protrusions 3. In grounding wire 2B, core wire 2a is disposed on the front surface of chassis 1B and welded or soldered. Hence, grounding wire 2B and chassis 1B are connected with a small electric resistance, and are not disconnected due to vibration or impact for a long period of time. Accordingly, ideal characteristics are achieved by a vehicle connection structure in which metal plate 1 is chassis 1B of the vehicle and lead wire 2 is grounding wire 2B.

Figure 10:
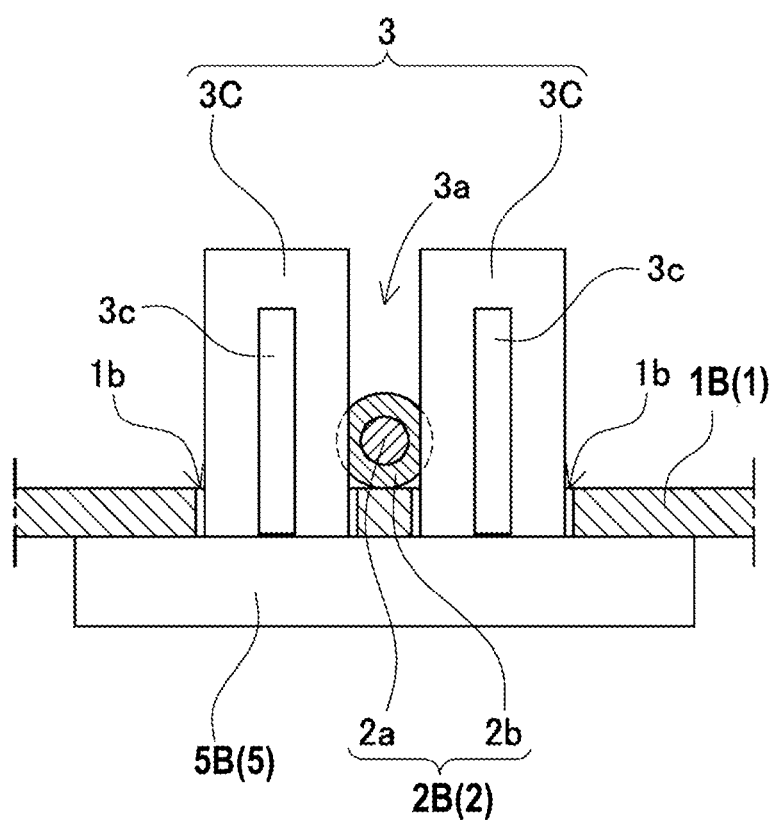
FIG. 10 is a cross-sectional view of another example of the lead wire connection structure.
Figure 11:
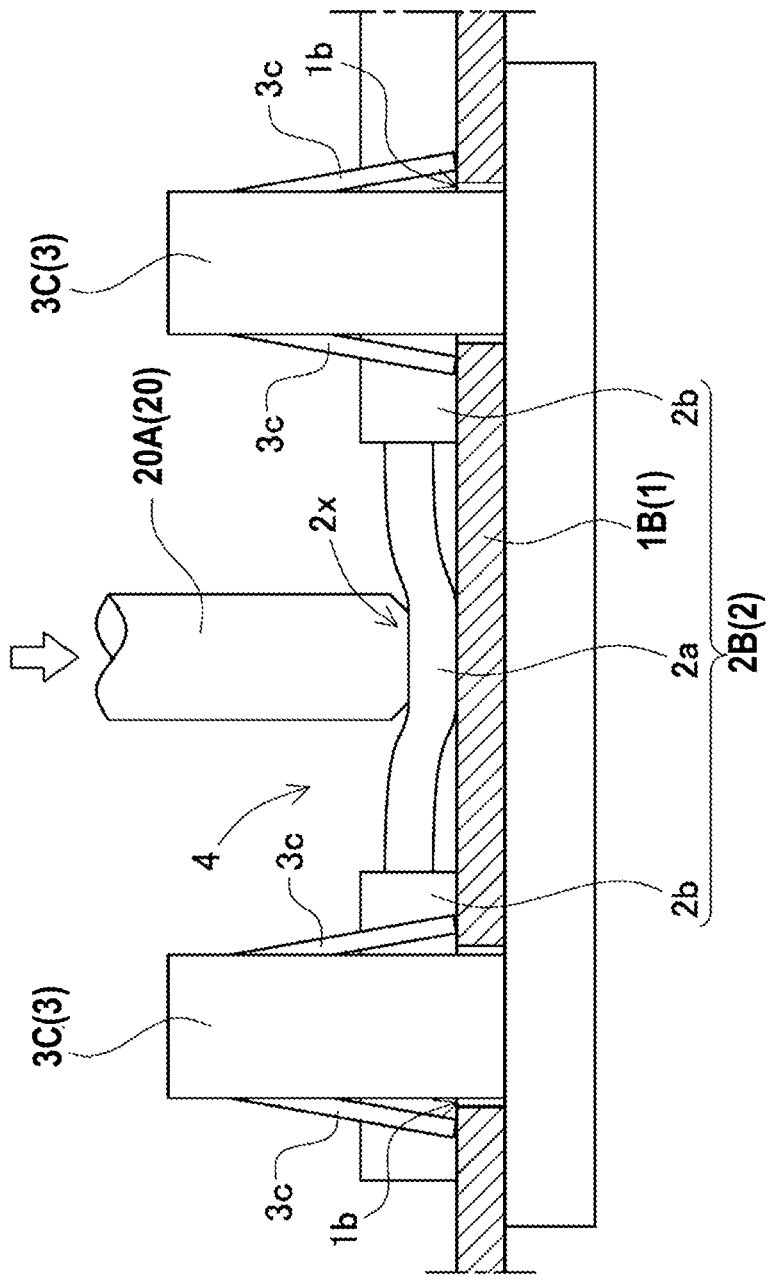
FIG. 11 is a longitudinal sectional view of the lead wire connection structure illustrated in FIG. 10.

Further, in a connection structure illustrated in FIGS. 10 and 11, in the exemplary embodiment in which metal plate 1 is chassis 1B of a vehicle and lead wire 2 is grounding wire 2B, holding protrusion 3 is holding body 5 that is a separate member from metal plate 1. As illustrated in the cross-sectional views of FIGS. 10 and 11, holding body 5 is disposed in a fixed position of metal plate 1 by inserting holding protrusion 3 including the pair of columnar projections 3C into through-hole 1b provided in metal plate 1. In holding body 5, base 5B placed on the back surface of metal plate 1 and the pair of columnar projections 3C are unitarily formed. Each columnar projection 3C includes elastic arm 3c protruding from the side surface integrally molded at the root so as to prevent each columnar projection 3C from being removed off when being inserted into through-hole 1b of metal plate 1. Holding protrusion 3 shown in FIGS. 10 and 11 includes elastic arms 3c on both sides. When elastic arm 3c is inserted into through-hole 1b, elastic arm 3c is elastically deformed so as to be thin to allow insertion of columnar projection 3C into through-hole 1b. After passing through through-hole 1b, columnar projection 3C is locked onto the front surface of metal plate 1 by restored elastic arms 3c, and is prevented from being removed off metal plate 1.

INDUSTRIAL APPLICABILITY

A lead wire connection structure of the present invention is a connection structure in which a lead wire is electrically connected to a metal plate by welding, soldering, or the like. This structure may be employed in any application in which a lead wire is connected to various metal plates, such as an application in which a voltage detection line of a power supply device including multiple batteries is connected to a lead plate or an application in which a grounding wire is connected to a chassis of an automobile.

REFERENCE MARKS IN THE DRAWINGS

1: metal plate
1A: lead plate
1B: chassis
1a, 1b: through-hole
2: lead wire
2A: voltage detection line
2B: grounding wire
2a: core wire
2b: insulative coating
2x: connection portion
3: holding protrusion
3A: projecting rod
3B: protrusion
3C: columnar protrusion
3a: holding gap
3b: insertion gap
3c: elastic arm
4: connection space
5: holding body
5A: battery holder
5B: base
10: power supply device
11: battery
12: core module
13: battery block
14: battery case
15: voltage detection circuit
16: controller
20: welding electrode
20A: first electrode
20B: second electrode
91: metal plate
92: lead wire
92a: core wire
93: locking connection portion
94: slit

The invention claimed is:

1. A lead wire connection structure comprising:
a metal plate;
a lead wire connected to a front surface of the metal plate; and
a pair of holding protrusions protruding from the front surface of the metal plate, and sandwich at least two parts of the lead wire to dispose the lead wire at a fixed position, each of the pair of holding protrusions sandwiching a respective one of the at least two parts of the lead wire, wherein
the each of the pair of holding protrusions has a holding gap therein to sandwich and hold the lead wire press-fitted in the holding gap,
a connection space of the lead wire and the metal plate is provided between the pair of holding protrusions,
the lead wire is held on the front surface of the metal plate by the pair of holding protrusions, and
the lead wire is connected to the front surface of the metal plate in the connection space,
the lead wire connection structure further comprising:
a holding body fixed to a back surface of the metal plate, wherein
the holding body has the pair of holding protrusions, and
the holding body is fixed to the metal plate to dispose the pair of holding protrusions on the front surface of the metal plate.

2. The lead wire connection structure according to claim 1, wherein
the each of the pair of holding protrusions has an insertion gap and the holding gap therein, the insertion gap guiding the lead wire through the insertion gap into the holding gap, and
the holding gap is narrower than the insertion gap.

3. The lead wire connection structure according to claim 2, wherein
the each of the pair of holding protrusions includes a pair of projecting rods disposed close to each other, and
the insertion gap and the holding gap are provided between the pair of projecting rods.

4. The lead wire connection structure according to claim 1, wherein the pair of holding protrusions hold a connection portion of the lead wire linearly in the connection space.

5. The lead wire connection structure according to claim 4, wherein
the each of the pair of holding protrusions includes a pair of projecting rods disposed close to each other in parallel to each other, and
an insertion gap and the holding gap are provided between the pair of projecting rods.

6. The lead wire connection structure according to claim 1, wherein an interval (L) of the connection space is wider than twice a thickness of the lead wire and narrower than 15 times the thickness of the lead wire.

7. The lead wire connection structure according to claim 6, wherein
the each of the pair of holding protrusions includes a pair of projecting rods disposed close to each other in parallel to each other, and
an insertion gap and the holding gap are provided between the pair of projecting rods.

8. The lead wire connection structure according to claim 1, wherein
the lead wire is a coated wire including an insulative coating and a core wire having a surface coated with the insulative coating,
the core wire has an exposed portion exposed from the insulative coating,
the exposed portion of the core wire is connected to the metal plate, and
the insulative coating is held by the pair of holding protrusions at a fixed position.

9. The lead wire connection structure according to claim 1, wherein
the holding body is a resin-molded body placed and fixed on the back surface of the metal plate,
the resin-molded body includes the pair of holding protrusions unitarily formed,
the metal plate has one or more through-hole therein, the pair of holding protrusions passing through the one or more through-hole and protruding from the metal plate, and
the pair of holding protrusions pass through the metal plate, so as to protrude from the front surface of the metal plate.

10. The lead wire connection structure according to claim 9, wherein the resin-molded body includes a battery holder configured to arrange batteries in fixed positions.

11. The lead wire connection structure according to claim 1, wherein the metal plate includes a lead plate connected to electrode terminals of batteries to connect the batteries in series or in parallel to one another.

12. The lead wire connection structure according to claim 1, wherein the pair of holding protrusions are formed by pressing the metal plate.

13. The lead wire connection structure according to claim 12, wherein
the metal plate includes a chassis of a vehicle, and
the lead wire includes a grounding wire connected to the chassis.

14. A lead wire connection structure comprising:
a metal plate;
a lead wire connected to a front surface of the metal plate; and
a pair of holding protrusions protruding from the front surface of the metal plate, and sandwich at least two parts of the lead wire to dispose the lead wire at a fixed position, each of the pair of holding protrusions sandwiching a respective one of the at least two parts of the lead wire, wherein
the each of the pair of holding protrusions has a holding gap therein to sandwich and hold the lead wire press-fitted in the holding gap,
a connection space of the lead wire and the metal plate is provided between the pair of holding protrusions,
the lead wire is held on the front surface of the metal plate by the pair of holding protrusions, and
the lead wire is connected to the front surface of the metal plate in the connection space,
the pair of holding protrusions are formed by pressing the metal plate,
the metal plate includes a chassis of a vehicle, and
the lead wire includes a grounding wire connected to the chassis.

15. The lead wire connection structure according to claim 14, further comprising
a holding body fixed to a surface of the chassis, wherein
the holding body has the pair of holding protrusions, and
the holding body is fixed to the chassis while the pair of holding protrusions are provided on a front surface of the chassis.

\* \* \* \* \*